(12) United States Patent
Jang et al.

(10) Patent No.: US 10,686,830 B2
(45) Date of Patent: Jun. 16, 2020

(54) CORROBORATING THREAT ASSERTIONS BY CONSOLIDATING SECURITY AND THREAT INTELLIGENCE WITH KINETICS DATA

(71) Applicant: International Business Machines Corporation, Armonk, NY (US)

(72) Inventors: Jiyong Jang, White Plains, NY (US); Dhilung Hang Kirat, White Plains, NY (US); Youngja Park, Princeton, NJ (US); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 15/848,337

(22) Filed: Dec. 20, 2017

(65) Prior Publication Data

US 2019/0190945 A1   Jun. 20, 2019

(51) Int. Cl.
*H04L 29/06* (2006.01)
*G06F 16/2458* (2019.01)
*G06N 20/00* (2019.01)

(52) U.S. Cl.
CPC ...... *H04L 63/1441* (2013.01); *G06F 16/2465* (2019.01); *H04L 63/1425* (2013.01); *H04L 63/1433* (2013.01); *G06F 2216/03* (2013.01); *G06N 20/00* (2019.01); *H04L 63/145* (2013.01)

(58) Field of Classification Search
None
See application file for complete search history.

(56) References Cited

U.S. PATENT DOCUMENTS

| | | | |
|---|---|---|---|
| 2008/0148398 A1 | 6/2008 | Mezack et al. | |
| 2010/0302956 A1* | 12/2010 | Haverty | H04K 3/22 370/252 |
| 2011/0119219 A1 | 5/2011 | Naifeh et al. | |
| 2014/0007238 A1* | 1/2014 | Magee | G06F 21/577 726/24 |
| 2016/0378978 A1* | 12/2016 | Singla | G06F 21/55 726/23 |

\* cited by examiner

*Primary Examiner* — Andrew J Steinle
(74) *Attorney, Agent, or Firm* — Jeffrey S. LaBaw; David H. Judson (57) ABSTRACT

A cognitive security analytics platform is enhanced by providing a computationally- and storage-efficient data mining technique to improve the confidence and support for one or more hypotheses presented to a security analyst. The approach herein enables the security analyst to more readily validate a hypothesis and thereby corroborate threat assertions to identify the true causes of a security offense or alert. The data mining technique is entirely automated but involves an efficient search strategy that significantly reduces the number of data queries to be made against a data store of historical data. To this end, the algorithm makes use of maliciousness information attached to each hypothesis, and it uses a confidence schema to sequentially test indicators of a given hypothesis to generate a rank-ordered (by confidence) list of hypotheses to be presented for analysis and response by the security analyst.

21 Claims, 6 Drawing Sheets

CORROBORATING THREAT ASSERTIONS BY CONSOLIDATING SECURITY AND THREAT INTELLIGENCE WITH KINETICS DATA

BACKGROUND

Technical Field

This disclosure relates generally to cybersecurity offense analytics.

Background of the Related Art

Today's networks are larger and more complex than ever before, and protecting them against malicious activity is a never-ending task. Organizations seeking to safeguard their intellectual property, protect their customer identities, avoid business disruptions, and the like, need to do more than just monitor logs and network flow data; indeed, many organizations create millions, or even billions, of events per day, and distilling that data down to a short list of priority offenses can be daunting.

Known security products include Security Incident and Event Management (SIEM) solutions, which are built upon rule-based mechanisms to evaluate observed security events. SIEM systems and methods collect, normalize and correlate available network data. One such security intelligence product of this type is IBM® QRadar® STEM, which provides a set of platform technologies that inspect network flow data to find and classify valid hosts and servers (assets) on the network, tracking the applications, protocols, services and ports they use. The product collects, stores and analyzes this data, and it performs real-time event correlation for use in threat detection and compliance reporting and auditing. Using this platform, billions of events and flows can therefore be reduced and prioritized into a handful of actionable offenses, according to their business impact. While SIEM-based approaches provide significant advantages, the rules are either hard coded or parameterized with a threat feed with concrete indicators of compromise (IoCs). Thus, typically these solutions are able to detect only known threats, but for unknown threats, e.g., detected by means of a behavior based rule, are unable to identify root cause and assist the security analyst. Moreover, these systems can present implementation challenges, as they often rely on manual curation of any semi-structured and unstructured threat feeds, i.e., natural language text, by means of security professionals reading threat advisories and extracting IoCs.

In particular, Security Operations Center (SOC) analysts who use such systems often are confronted with a large number of offenses every day. The majority of their time is spent to understand and analyze these offenses, confirm their validity, find related information, and attempt to find appropriate actions to resolve them. Upon analysis of a potential threat, e.g., using cognitive cybersecurity analytics methods, a plurality of hypotheses about the background or cause of a threat may be generated. When analyzing a cybersecurity alert, however, a central problem a security analyst often faces is the presence of multiple possible hypothesis regarding the potential root cause of a collection of events. To address this problem, there exist a variety of methods to generate hypotheses from a set of observed behaviors, and these methods include both automated techniques (e.g., using cognitive security analytics) that exhaustively test all observables for all hypothesis against historical data, to manual approaches (e.g., using search engines) that rely upon analyst intuition regarding what observables relate to a given hypothesis to be validated against that data. Even so, it may be that none of these hypotheses are sufficiently supported by the observables at hand during the investigation. In such case, significant additional manual analysis of potentially related events is required, and this often involves tedious loading of historical data files and searching for indicators that increase the confidence in one or more hypotheses.

While the known automated approaches may reduce the analyst's workload, they put heavy query and processing load on data archival systems, thereby increasing the expense associated with any remediation or mitigation efforts that must be taken to address the cybersecurity threat.

BRIEF SUMMARY

The technique of this disclosure addresses these and other known deficiencies in the prior art by providing a computationally- and storage-efficient data mining technique to improve the confidence and support for one or more hypotheses, leading to a faster decision process for security analysts. In so doing, the method enables the security analyst to more readily validate a hypothesis and thereby corroborate threat assertions to identify the true causes of a security offense or alert. The data mining technique is entirely automated but involves an efficient search strategy that significantly reduces the number of data queries to be made against a data store of historical data. To this end, the algorithm preferably makes use of maliciousness information attached to each hypothesis, and it uses a confidence schema to sequentially test indicators of a given hypothesis to generate a rank-ordered (by confidence) list of hypotheses. As such, the subject matter provides a mechanism and method to reduce the time required for security analyst alert investigation.

According to a first aspect of this disclosure, an automated method is provided to corroborate and act upon a threat assessment. The threat assessment comprises a security offense defined by a set of observable features in a collection of events associated to the security offense. The method begins providing a set of hypotheses to account for the set of observable features, wherein each hypothesis has associated therewith a confidence value, together with a set of indicators whose presence in the set of observable features is unknown. The set of hypotheses are rank ordered initially according to the confidence values. A confidence schema is then applied to the initial rank ordering. In particular, and for each hypothesis in the set of hypotheses, the confidence value is adjusted based on an extent to which each indicator in the set of indicators for the hypothesis occurs in the collection of events. To this end, the set of indicators in each hypothesis are tested for occurrence in the collection of events sequentially, beginning with a highest ranked indicator (and continuing in order), and the testing generates a cumulative confidence value for the hypothesis. The rank ordering of the set of hypotheses is then adjusted based on the adjusted confidence data (namely, the cumulative confidence values of respective hypotheses). The adjusted rank-ordered set of hypotheses are then used to facilitate providing of a response to the security offense.

According to a second aspect of this disclosure, an apparatus for processing security event data is described. The apparatus comprises a set of one or more hardware processors, and computer memory holding computer program instructions executed by the hardware processors to perform a set of operations such as described above.

According to a third aspect of this disclosure, a computer program product in a non-transitory computer readable medium for use in a data processing system for processing security event data is described. The computer program product holds computer program instructions executed in the data processing system and operative to perform operations such as described above.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
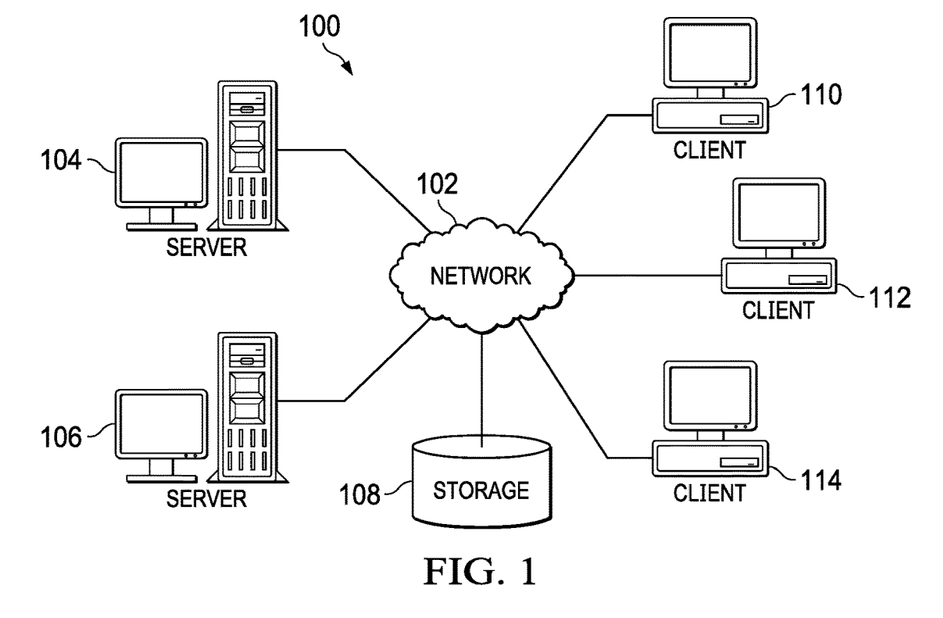
FIG. 1 depicts an exemplary block diagram of a distributed data processing environment in which exemplary aspects of the illustrative embodiments may be implemented.
Figure 2:
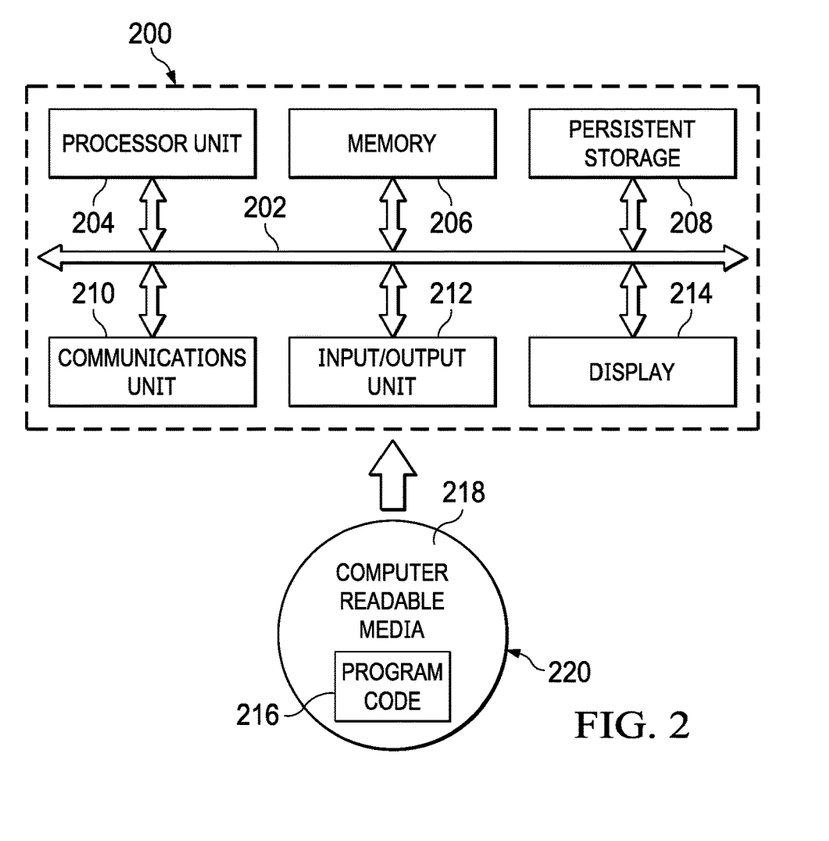
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices.

For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
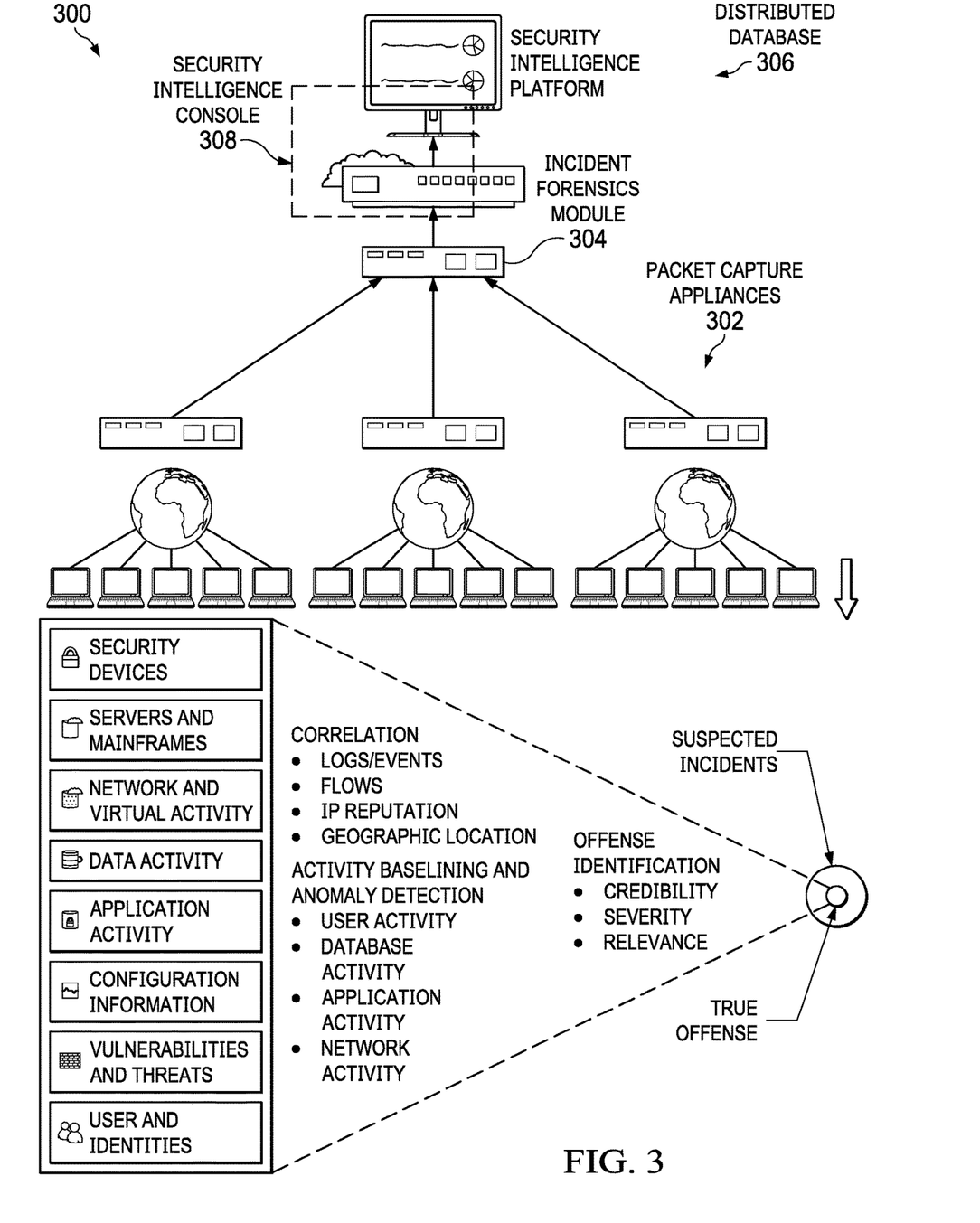
FIG. 3 illustrates a security intelligence platform in which the techniques of this disclosure may be practiced.

A known type of security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

As further background, the following describes a technique for cognitive offense analysis.

Cognitive Offense Analysis

It is also known to process security event data in association with a cybersecurity knowledge graph ("KG"). A cybersecurity knowledge graph is derived from one or more data sources and includes a set of nodes, and a set of edges. The method preferably is automated and begins upon receipt of information from a security system (e.g., a STEM) representing an offense. Based on the offense type, context data about the offense is extracted, and an initial offense context graph is built. The initial offense context graph typically comprises a set of nodes, and a set of edges, with an edge representing a relationship between a pair of nodes in the set. At least one of the set of nodes in the offense context graph is a root node representing an offending entity that is determined as a cause of the offense. The initial offense context graph also includes one or more activity nodes connected to the root node either directly or through one or more other nodes of the set, wherein at least one activity node has associated therewith data representing an observable. The root node and its one or more activity nodes associated therewith (and the observables) represent a context for the offense. The knowledge graph and potentially other data sources may then be examined to further refine the initial offense context graph.

In particular, the knowledge graph is explored by locating the observables (identified in the initial offense graph) in the knowledge graph. Based on the located observables and their connections being associated with one or more known malicious entities as represented in the knowledge graph, one or more subgraphs of the knowledge graph are then generated. A subgraph typically has a hypothesis (about the offense) associated therewith. Using a hypothesis, the security system (or other data source) may then be queried to attempt to obtain one or more additional observables (i.e. evidence) supporting the hypothesis. Then, a refined offense context graph is created, preferably by merging the initial offense context graph, the one or more sub-graphs derived from the knowledge graph exploration, and the additional observables mined from the one or more hypotheses. The resulting refined offense context graph is then provided (e.g., to a SOC analyst) for further analysis.

An offense context graph that has been refined in this manner, namely, by incorporating one or more subgraphs derived from the knowledge graph as well as additional observables mined from examining the subgraph hypotheses, provides for a refined graph that reveals potential causal relationships more readily, or otherwise provides information that reveals which parts of the graph might best be prioritized for further analysis. The approach greatly simplifies the further analysis and corrective tasks that must then be undertaken to address the root cause of the offense.

Figure 4:
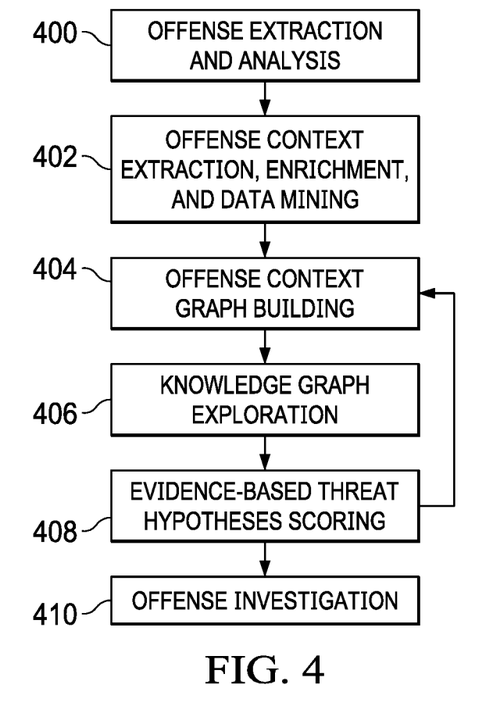
FIG. 4 depicts a high level process flow of a cognitive analysis technique.

With reference now to FIG. 4, a high level process flow of the above-described cognitive offense analysis technique is provided. The routine begins at step 400 with offense extraction and analysis. In this step, an offense is extracted from a SIEM system, such as IBM QRadar, for deep investigation. Typically, a detected offense may include many different entities, such as offense types, fired rules, user names, and involved indicators of compromise.

At step 402, the process continues with offense context extraction, enrichment and data mining. Here, offense context is extracted and enriched based on various information or factors such as, without limitation, time, an offense type, and a direction. This operation typically involves data mining around the offense to find potentially related events. The process then continues at step 404 to build an offense context graph, preferably with the offending entity as the center node and contextual information gradually connected to the center node and its children. Examples of contextual information can be represented by activity nodes in the graph. Typically, an activity comprises one or more observables, which are then connected to the respective activity, or directly to the center node.

The process then continues at step 406. In particular, at this step a knowledge graph is explored, preferably using a set of observables extracted from the offense context graph. This exploration step identifies related and relevant pieces of information or entities available from the knowledge graph. A primary goal in this operation is to find out how strongly the input observables are related to malicious entities in the knowledge graph. If the event related entities are strong malicious indicators, a hypothesis (represented by a subgraph in the knowledge graph) is generated. The process then continues at step 408. At this step, the resulting subgraph (generated in step 406) is mapped into the original offense context graph and scored. To reinforce the hypothesis (represented by the subgraph), additional evidence may be obtained (and built into the offense context graph) by querying local STEM data for the presence of activities that are related to the hypothesis that is returned by the KG exploration in step 406. Additional findings as part of the hypothesis scoring may also be used to extend the offense context graph further and/or to trigger new knowledge graph explorations. Thus, step 408 represents an evidence-based scoring of the threat hypothesis.

The process then continues at step 410 with an offense investigation. At this point, the offense hypothesis includes the original offense IOCs (indicators of compromise), knowledge graph enrichment, evidence, and scores. The extended offense context graph is then provided to the SOC analyst (user) for offense investigation. The SOC user reviews the hypothesis that has been weighted in the manner described, and can then choose the right hypothesis that explains the given offense. There may be multiple hypotheses, and these may be ranked according to the technique of this disclosure that is described below in connection with FIG. 7.

If additional or further exploration and more evidence are needed to make a decision, the SOC user can elect to nodes or edges in the offense context graph and repeat steps 406 and 408 as needed. This iteration is depicted in the drawing.

Figure 5:
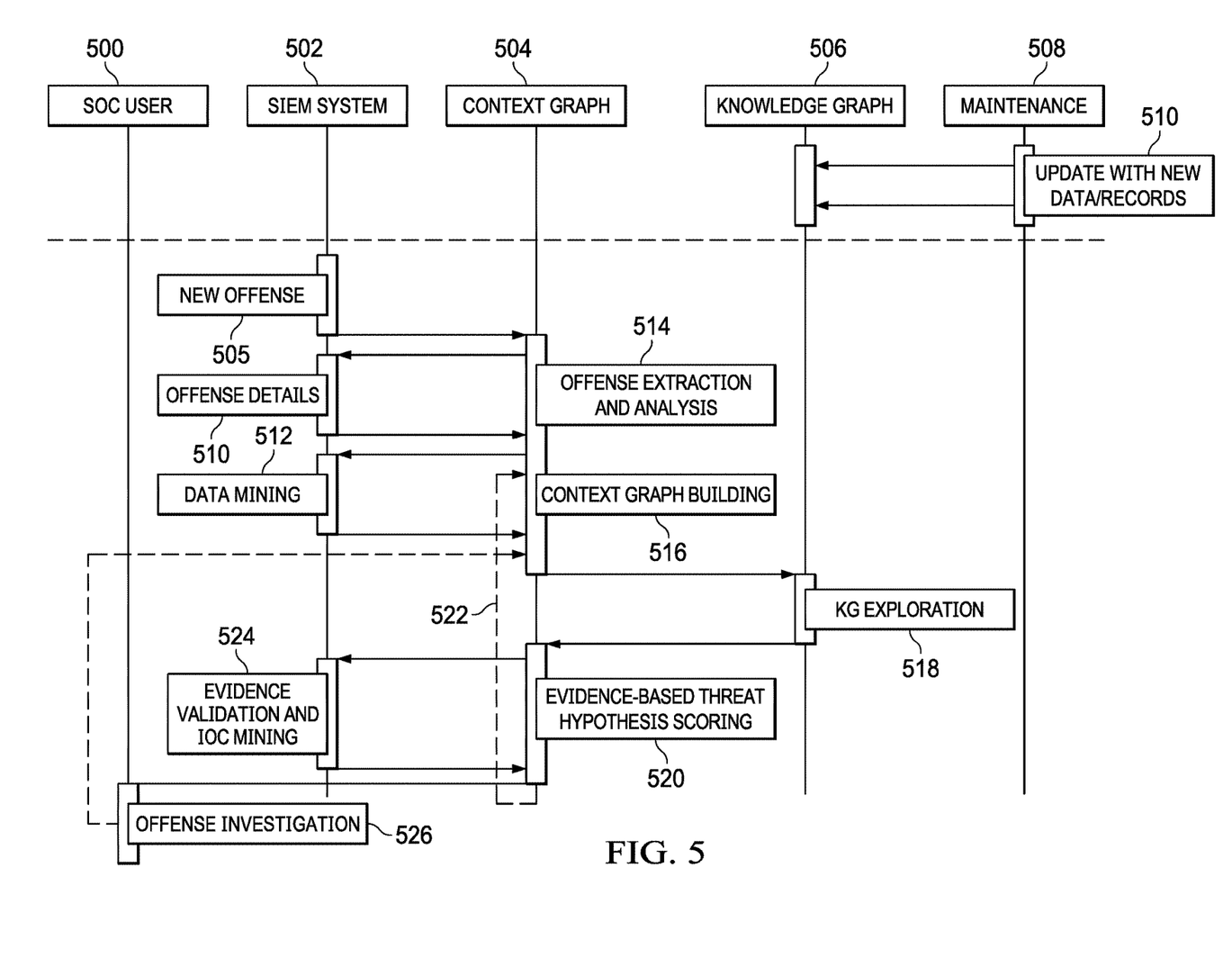
FIG. 5 depicts the cognitive analysis technique of FIG. 4 in additional detail.

FIG. 5 depicts a modeling diagram showing the various entities involved in the above-described technique and their interactions. As depicted, these entities include the SOC user 500, the SIEM system 502, the (offense) context graph 504, a knowledge graph 506, and a maintenance entity 508. Viewing the interactions from top to bottom, the knowledge graph 506 may be updated with new data/records 510 periodically; this operation is shown as an off-line operation (above the dotted line). The remainder of the figure depicts the process flow referenced above. Thus, the new offense 505 is identified by the SIEM system 502 and used together with the offense details 510 and data mining 512 to generate the context graph 504 via the offense extraction and analysis 514 and context graph building 516 operations. Once built, the knowledge graph 506 is explored 518 to identify one or more subgraphs. The evidence-based threat hypothesis scoring uses the subgraphs at operation 520, and the process may iterate (operation 522) as previously described. After evidence validation and IOC mining 524, the offense investigation 526 is then carried out, typically by the SOC user 500.

Figure 6:
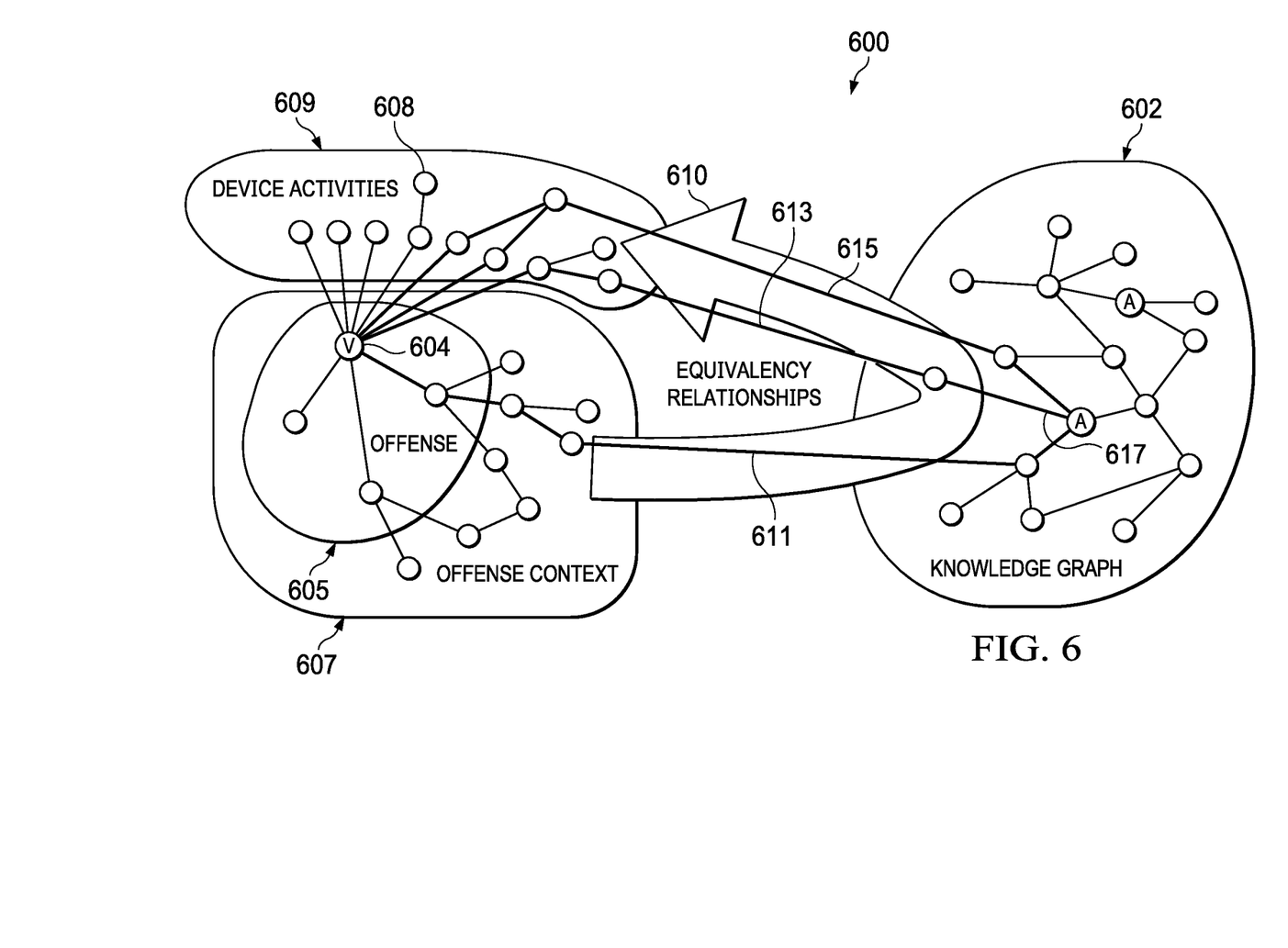
FIG. 6 depicts how an offense context graph is augmented using a security knowledge graph.

FIG. 6 depicts an offense context graph 600 augmented by the knowledge graph 602. In general, the offense context graph 600 depicts local kinetics, e.g., events and intelligence related to an offense, e.g., SIEM offense data, log events and flows, and such information preferably is augmented from the information derived from the knowledge graph 602. The knowledge graph typically is global in nature and scope, as it preferably depicts external cyber security and threat intelligence, cyber security concepts, and the like. Typically, the knowledge graph is informed by combining multiple structured and unstructured data sources. As shown, the offense context graph is centered around a root node 604 that has child nodes 606 within the "offense" 605. The "offense context" 607 includes still other nodes of relevance. There may also be a set of device activities 609 that include relevant device nodes 608. As depicted by the arrow 610, augmenting the context graph 600 using the knowledge graph 602 examines whether there is any path (such as one or more of paths 611, 613 or 615) from a node in the set of offense context nodes 607 to a node in the set of device activities 609 that passes through one or more nodes of the knowledge graph 602 (to which a threat activity is attached). In the example shown, there is one or more such paths (611, 613 and 615), and the relevant subgraph 617 in the knowledge graph thus is captured and used to augment the offense context graph.

Thus, in the approach, details of an offense are extracted from a SIEM system, such as QRadar. The details typically include offense types, rules, categories, source and destination IP addresses, and user names. For example, an offense may be a malware category offense that indicates that malicious software is detected on a machine. Accordingly, activities of the machine around the offense need to be examined to determine infection vectors and potential data leakage. Of course, the nature of the activities that will need to be investigated will depend on the nature of the offense.

Offense context related to an identified offense is then extracted and enriched depending on various factors, such as time, an offense type, and a direction. For example, if an offense type is a source IP, system and network activities of the same source IP (which may or may not be captured at other offenses) may then be collected. This collected context depicts potential casual relationships among events, and this information then provides a basis for investigation of provenance and consequences of an offense, e.g., Markov modeling to learn their dependencies. Of course, the nature of the offense context extraction and enrichment also depends on the nature of the offense.

From the contextual data extracted (as described above), an initial offense "context graph" 600 in FIG. 6 is built, preferably depending on offense types, such that a main offense source becomes a root 604 of an offense context graph, and offense details are then linked together around the root node. As noted above, the initial context graph preferably is then enriched and, in particular, by correlating local context, to further identify potential causal relationships among events. This helps analysts perform deep, more fine-grained investigation of provenance and consequences of the offense.

Provenance context preferably is extracted by identifying other offenses wherein the offense source is a target, e.g., an exploit target. Similarly, consequence context is extracted, preferably by finding other offenses wherein the offense source also is a source, e.g., a stepping stone. Similarly, consequence context is extracted by finding other offenses. Thus, this graph typically contains the offending entity (e.g., computer system, user, etc.) as the center (root) node of the graph, and contextual information is gradually connected to the node and its children. The result is the offense context 607 in FIG. 6. Examples of contextual information will depend on the nature of the offense; such information can be represented by activity nodes that include, without limitation, network activity, user activity, system activity, application activity, and so forth. Preferably, an activity comprises one or more observables, which are then connected to the respective activity nodes or directly to the center node. Further, the context graph can be extended with additional nodes representing information that does not directly relate to the original offense. For example, and by means of data mining (e.g., behavior-based anomaly detection, sequence mining, rule-based data extraction, and the like) of security-related events in temporal vicinity to the offense, additional activities of interest can be extracted and added to the context graph. This operation is represented in the graph by device activities 606.

Thus, in the cognitive analytics approach as outlined above, details of an offense are extracted from a SIEM system. The details include (but are not limited to) offense types, rules, categories, source and destination IPs, and user names. An initial offense context graph is built depending on offense types, such that the main offense source becomes the root of an offense context graph and offense details are linked together around the root node. The initial context graph is then enriched by correlating local context to further identify potential casual relationships among events, which helps analysts perform deep investigation of provenance and consequences of the offense. Provenance context is extracted by identifying other offenses where the offense source is a target, e.g., an exploit target. Similarly, consequence context is extracted by finding other offenses where the offense target is a source, e.g., a stepping stone. The enriched (and potentially dense) offense context graph is then pruned to highlight critical offense context for the SOC analyst's benefit. Typically, pruning is applied based on several metrics, such as weight, relevance, and time. For example, it may be desirable to assign weight to each event detail based on offense rules and categories to thereby indicate key features contributing to an offense.

Once the initial offense context graph is built, preferably that context graph is further enriched, validated and/or augmented based on information derived from a cybersecurity knowledge graph (KG) 602, which preferably is a source of domain knowledge. The knowledge graph, like the initial offense context graph, comprises nodes and edges. The cybersecurity knowledge graph can be constructed in several ways. In one embodiment, one or more domain experts build a KG manually. In another embodiment, a KG 602 is built automatically or semi-automatically, e.g., from structured and unstructured data sources. As noted above, the context extraction and analysis processes provide a list of observables related to the given offense. According to this operation, the observables preferably are then enriched using the in-depth domain knowledge in the KG. This enrichment (or knowledge graph exploration) is now described.

In particular, this knowledge graph (KG) enrichment operation can be done in several different ways. In one approach, enrichment involves building sub-graphs related to the observables. To this end, the system locates the observables in the KG and discovers the connections among them. This discovery may yield one or more subgraphs (such as 617 in FIG. 6) showing the relationships of the given observables with other related security objects such as observables and threats. These subgraphs can provide a broader view on the given offense.

In another enrichment scenario, a SOC analyst can perform the query knowledge graph (KG) exploration step receives a set of observables, such as IP, URL, and files hashes, extracted from the SIEM offense. This exploration step seeks to identify all related and relevant pieces of information or entities available in the knowledge graph. The main goal is to find out how strongly the input observables are related to malicious entities in the knowledge graph. Some of the related entities can be strong malicious indicators, and thus a hypothesis about the offense can be generated. The related malicious entities might be strongly related among themselves, which also creates a hypothesis. Generalizing, an output of this step is a set of one or more hypotheses, which are consumed during the evidence-based threat hypothesis scoring operation where they are evaluated against local SIEM data. Preferably, and as noted above, the extraction of related entities is performed by traversing the knowledge graph, preferably starting from the input observables and extracting the subgraph. In general, unconstrained subgraph extraction may result in a very large and noise graph. Preferably, one or more traversal algorithms that focus on finding different types of related information by exploring the graph and pruning less relevant entities from the result may be deployed. One or more of these pruning algorithms may be run serially, in parallel, or otherwise. In addition, where possible coefficients of the graph entities are precomputed to enhance the efficiency of the graph traversal.

The following describes additional details of the evidence-based threat hypothesis scoring. Preferably, the knowledge graph exploration step returns a subgraph of observables, along with one or more annotations associated with the hypotheses. This subgraph preferably is then mapped into the original context graph. To reinforce the hypotheses, it may be desirable to build further relevant evidence, e.g., by querying local SIEM data for the presence of activities that are related to the hypotheses returned by the knowledge graph exploration. These activities may not have been flagged before by a simple rule-based offense monitor. This operation thus builds a merged graph that includes input from three sources, the original context graph, the knowledge graph exploration subgraph, and the additional observables queried for building the evidence for the hypotheses.

As also described, the final operation typically is offense investigation. Based on the prior operations described, the offense hypotheses now include the original offense IOCs, knowledge graph enrichment and supporting evidences, and their scores. This extended graph then is provided to an SOC analyst for an offense investigation. The SOC analyst reviews the weighted hypotheses and chooses the right hypothesis that explains the given offense. The selection itself may be automated, e.g., via machine learning. If further exploration and more evidence are needed to make a decision, the SOC can choose the nodes and/or edges of interest in the hypothesis graphs, and then repeat the above-described steps of knowledge graph exploration and evidence-based threat hypotheses scoring. During the hypothesis review process, the SOC may learn new facts and insights about the offense and, thus, add additional queries (e.g. observables or relationship) in a next iteration. The SOC analyst thus can use this iterative knowledge enrichment, evidence generation and hypothesis scoring to gain a deep understanding of the offense and actionable insights that may then be acted upon.

Thus, the basic notion of this approach is to use an autonomic mechanism to extract what is known about an offense (or attack), reason about the offense based on generalized knowledge (as represented by the knowledge graph), and thereby arrive at a most probable diagnosis about the offense and how to address it.

As noted above, it may be desirable to explore the knowledge graph, e.g., to reduce its size to a more manageable level. To this end, a signal flow analysis-based exploration of security knowledge represented in the graph structure may be implemented. In this approach, "conductance" values are associated to each of a set of edges. Each node has an associated "toxicity" value representing a degree of maliciousness associated with the node. The conductance value associated with an edge is a function of at least the toxicity values of the nodes to which the edge is incident. A signal flow analysis may be conducted with respect to an input node representing an observable associated with an offense. The flow analysis seeks to identify a subset of the nodes that, based on their conductance values, are reached by flow of a signal representing a threat, wherein signal flow over a path in the graph continues until a signal threshold is met. Based on the analysis, nodes within the subset are designated as hypothesis nodes for further examination. Entities that are not in the path from an input node to the hypothesis nodes preferably are pruned.

Corroborating Threat Assertions by Consolidating Security/Threat Intelligence with Kinetics Data A cognitive security analytics platform such as described above is further enhanced by providing a computationally- and storage-efficient data mining technique to improve the confidence and support for one or more hypotheses presented to a security analyst. The approach herein enables the security analyst to more readily validate a hypothesis and thereby corroborate threat assertions to identify the true causes of a security offense or alert. As previously described, the data mining technique is entirely automated but involves an efficient search strategy that significantly reduces the number of data queries to be made against a data store of historical data. To this end, the algorithm preferably makes use of maliciousness information (e.g., as embodied in a toxicity value) attached to each hypothesis, and it uses a confidence schema to sequentially test indicators of a given hypothesis to generate a rank-ordered (by confidence) list of hypotheses to be presented for analysis and response by the security analyst.

As used herein, a hypothesis is a possible cause (e.g., a root cause) of a collection of one or more events that comprise a threat to a resource (e.g., a network resource). These events typically are generated using known cognitive analytics methods and systems, such as described above. As will be seen, the approach herein to rank-ordering of multiple hypotheses is highly efficient, as it operates in a fully automated manner but does so without requiring exhaustive testing of all observables for all hypotheses, e.g., against historical data.

To this end, a method of corroborating a threat assessment uses a data mining algorithm that uses a search strategy favoring a lower number of data queries to be made against a data store versus exhaustive testing of observables against the historical data. This trade-off is facilitated by method that is now described. It assumes the receipt of a security offense for a particular time span and a given subject, and the security offense has associated therewith a set of observable features (observables) in a collection of events associated to the offense. In response to receipt of a security offense, a first rank ordered list of hypotheses (available for the set of observables) is provided. These hypotheses preferably are ranked according to an initial confidence level based on the collection of events. For each hypothesis in the initial rank ordered list, a set of indicators for the hypothesis are then ranked according to a confidence level. In particular, if a respective indicator is found the hypothesis is true. For each hypothesis in the initial rank ordered list, a highest ranked indicator is tested for an occurrence in the collection of events; a result of the testing is a new confidence level. The testing is repeated on a next highest ranked indicator for each hypothesis in the initial rank ordered list. The result of the testing is added to a cumulative confidence level for a respective hypothesis until a confidence level for at least one hypothesis has exceeded a confidence level. The hypotheses within the first rank ordered list are then re-ranked according to the respective cumulative confidence levels of the respective hypotheses. Any hypothesis in the initial rank ordered list having no tested indicators that occurred in the collection of events preferably is removed from the list. This approach is automated and does not require human (manual) steps, and it results in a rank-ordered (by confidence) list of hypotheses, thereby leading to a faster decision process for the security analyst.

Figure 7:
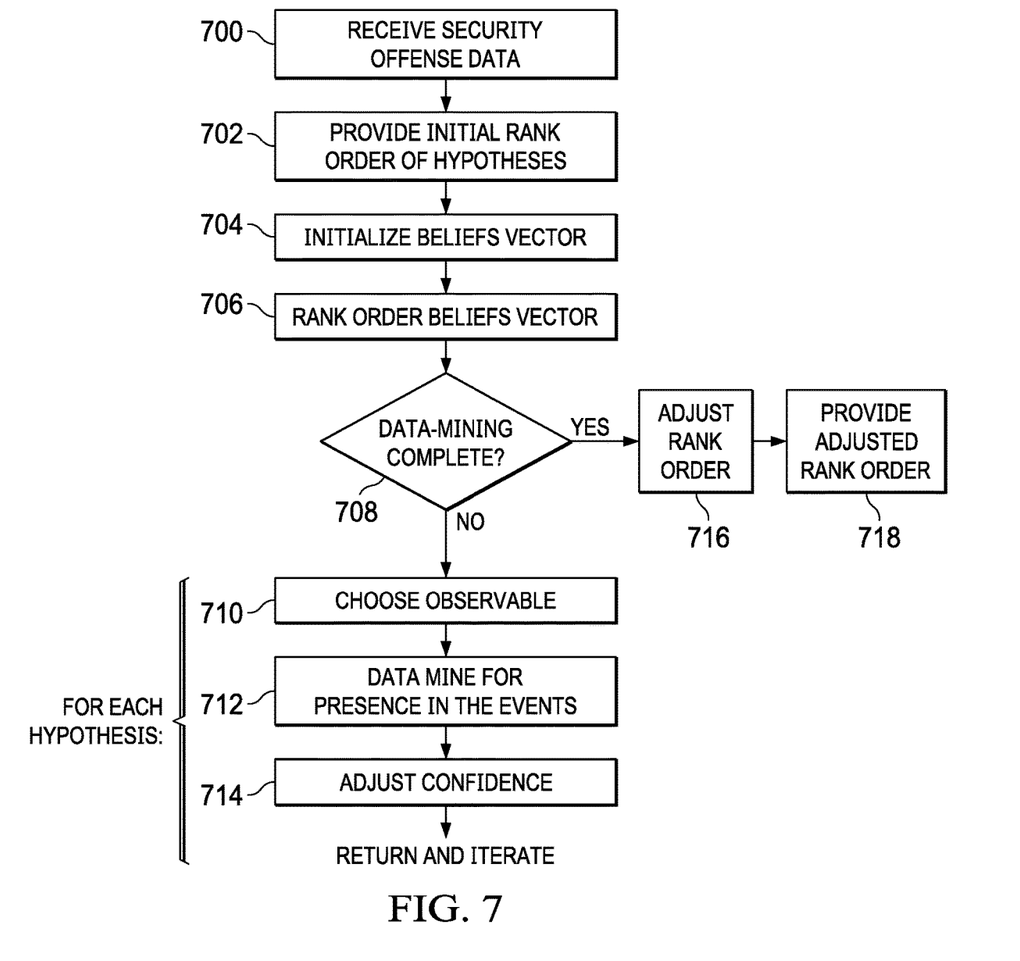
FIG. 7 depicts a process flow of a preferred technique of this disclosure to corroborate a threat assertion using a data mining algorithm that is automated and computationally- and storage-efficient.

FIG. 7 depicts a preferred process flow for the automated data mining algorithm of this disclosure. The process steps preferably are implemented in a set of computer program instructions (program code) executing in one or more hardware processors. The instructions are stored (held) in memory or a data store. The routine begins at step 700 upon receipt of a security offense E for a time span $[t_s\ t_e]$ (where $t_s$ is a start time, and $t_e$ is an end time), and a given subject A. The security offense is defined by a set $O=\{o_1, o_2 \ldots o_m\}$ of observable features in a collection of events associated to the offense. There is a set $H=\{h_1, h_2 \ldots h_n\}$ that are the n hypotheses available for O. According to this disclosure, there are two values associated to every hypothesis $h_i$, namely, a confidence value $c_i$, and a maliciousness (toxicity) value $m_i$. The confidence (or conductance) value indicates an a priori belief in the hypothesis from analysis of the events (and the corresponding observable features O). Moreover, every hypothesis in the initial list typically has $k_i$ directly or indirectly associated indicators $S_i = s_{i,\ j}$ (where $1 \leq j \leq k_i$) that may or may not have been present in O, wherein the presence of an indicator may increase the confidence in a hypothesis. For every indicator ($=s_{i,\ j}$), there exists a quantity $c_{i,\ j}$ that measures the confidence that the indicator $s_{i,\ j}$ is related to the particular hypothesis $h_i$. An indicator may be associated with multiple hypotheses $h_i$ and $h_j$. Typically, the confidence $c_{i,\ j}$ measures only a mutual confidence (conductance) between an indicator s ($=s_{i,\ j}$) and a hypothesis $h_i$. The "j" in $c_{i,\ j}$ relates to the number of an indicator of a given hypothesis "i." Thus, hypothesis "i" may have $k_i$ indicators, denoted as $s_{i,j}$, $1 \leq j \leq k_i$. Further, $S_i' = S_i \backslash O$ is defined as a set of indicators that are not present in the observable features in the security offense.

More formally, as used herein, an "indicator" is a property (e.g., IP address, file hash, domain name, etc.) known to be related to a threat/attack hypothesis. The existence of an indicator does not necessarily mean that all indicators of an attack have been observed (the "observables"), as an attacker may use different properties to conceal or evade detection. For example, the attacker may alternate between different IP address for his command and control infrastructure (to which malware connects to obtain commands); all of these IP addresses are indicators of the malware, although typically only one of the IP addresses on a given network might actually be seen (and thus is an "observable").

With the above definitions in place, the algorithm then begins at step 702. At this step, the hypotheses H are rank-ordered according to their $c_i$ values. This is the first rank ordered list of hypotheses as described above. At step 704, a beliefs vector $B=\{b_1, \ldots b_n\}=\{c_1, \ldots c_n\}$ is initialized. Formally, a "belief" represents a belief that a given hypothesis is indeed true, e.g., when checking all of the indicators of the hypothesis against historical logs or other data. The routine then continues at step 706 by rank-ordering the set of indicators $S_i$ according to their $c_{i,j}$ values. A test is then performed at step 708 to determine whether the data mining is complete. Preferably, the mining is iterated (as will be described) until one of the following conditions is true: one or k values in the beliefs vector B exceed a configurable belief threshold β, all observables in $S_i$ have been data-mined, or a number r of iterations have been completed. When the outcome of the test at step 708 indicates that data mining is not yet complete, the routine continues at step 710. At this step, and for every hypothesis $h_i$ in H, a first observable $s_f$ in $S_i$ is chosen. The routine then continues at step 712 to data mine for the presence of the observable $s_f$ in the one or more events describing behavior by the subject A during a time span $[t_s-T_1, t_e+T_2]$. If $s_f$ is found in the one or more events, then the routine continues at step 714 to update the beliefs vector for the hypothesis (such that $b_i=b_i+c_{i,f}$) to complete the data mining for this observable. Control then returns to step 708 and iterates. Thus, steps 710, 712 and 714 are repeated for each hypothesis in the set of hypotheses. When the outcome of the test at step 708 indicates that data mining is complete (because one or more values in the beliefs vector exceed the belief threshold, all observables in $S_i$ have been mined, or the configurable number of iterations has otherwise been reached), the routine continues at step 716 to re-rank order H according to the belief quantities (the $b_i$ values) and to evict any $h_i | b_i = c_i$ (i.e., a hypothesis that has no tested indicators that occur in the collection of events) to complete the mining process. At step 718, the new rank ordered set H is returned to the security analyst (or other interested entity) along with the belief quantities and the observables $s_{i,j}$. In an alternative embodiment, and following step 714, an additional optimization step may be included that evicts a lowest belief hypothesis $h_i$ ($b_i < b_j$ for all j !=i) in every round.

In this approach, the beliefs are updated from the confidence values if an indicator is observed locally. If an indicator (e.g., an IP address being returned by a search) has not been seen locally, preferably its confidence is not used to update the belief.

Although the FIG. 7 embodiment as described focuses on confidence as the main driver of the rank ordering, the maliciousness value is also utilized (as a second priority). In this approach, and as mentioned above, preferably a two-dimensional weight [confidence, maliciousness] is given to every hypothesis, and how each dimension is weighed preferably can be configured. By default, a value "1" is given to confidence, and a value "0" to maliciousness. Of course, other values may be used, such as a pair of values, e.g., 0.8 and 0.2, which would indicate that a highly-toxic hypothesis (with lower confidence) may still generate beliefs because of the high maliciousness/risk of a given indicator. As a variant, the notion of relevance $r_i$ may be applied (instead of $c_i$), where one would derive $r_i=f(c_i, m_i)$, with f (•,•) being a weighting function. Note that one could apply the same to $c_{i,j}$ (confidence and maliciousness/toxicity for every individual indicator).

Without intending to be limiting, the approach herein may be used in association with cognitive offense analytical techniques such as described above with respect to FIGS. 4-6.

The technique herein provides significant advantages. The approach enables the verification or corroboration of a threat hypothesis (e.g., obtained from an enrichment/query to a knowledge graph) by validating the hypothesis against local threat kinetics (e.g., network, system, host logs, etc.) As such, it enables improved threat disposition analysis and modeling, thereby providing significant processing efficiencies over known techniques. In general, it enables the security analyst to more quickly and accurately corroborate a threat assessment associated with a cybersecurity alert. These benefits are achieved using entirely automated processing, but without requiring exhaustive testing of large amounts of historical data that are computationally-intensive and storage-inefficient. The approach provides a streamlined and efficient data mining process that can be used to provide a rank ordered (by confidence) list of hypotheses that can then be further analyzed, e.g., using local threat kinetics data, to determine a true cause of the security alert.

By significantly reducing the analyst's time to resolve an alert, the technique provides significant productivity and threat disposition results over prior art techniques, such as static scoring algorithms that do not take into account historical context, feedback on alert handling from senior analysts, and so forth. Based on the efficient rank ordering of the hypotheses, the analyst is able to improve the accuracy of his or her handling on the alert, and the approach herein also reduces the amount of time needed to investigate an alert (e.g. when the alert is a false positive).

This subject matter may be implemented as-a-service. The subject matter may be implemented within or in association with a data center that provides cloud-based computing, data storage or related services. The data mining functionality may be provided as a standalone function, or it may leverage functionality from other products and services including, without limitation, a Question-Answer based Natural Language Processing (NLP) system, products, device, program or process.

In a typical use case, a SIEM or other security system has associated therewith an interface that can be used to render the rank-ordering of hypotheses-related information visually, to search and retrieve relevant information from alert database, and to perform other known input and output functions with respect thereto.

As noted above, the approach herein is designed to be implemented in an automated manner within or in association with a security system, such as a SIEM.

The alert information itself may be processed using a question and answer (Q&A) system, such as a natural language processing (NLP)-based artificial intelligence (AI) learning machine. A machine of this type may combine natural language processing, machine learning, and hypothesis generation and evaluation; it receives queries and provides direct, confidence-based responses to those queries. A Q&A solution such as IBM Watson may be cloud-based, with the Q&A function delivered "as-a-service" (SaaS) that receives NLP-based queries and returns appropriate answers. In an alternative embodiment, the Q&A system may be implemented using IBM LanguageWare, a natural language processing technology that allows applications to process natural language text. LanguageWare comprises a set of Java libraries that provide various NLP functions such as language identification, text segmentation and tokenization, normalization, entity and relationship extraction, and semantic analysis.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., security incident and event management (SIEM) systems, other security systems, as well as improvements to automation-based cybersecurity analytics.

Having described the invention, what we claim is as follows:

1. An automated method of corroborating and acting upon a threat assessment, the threat assessment comprising a security offense defined by a set of observable features in a collection of events associated to the security offense, comprising:
   providing a set of hypotheses to account for the set of observable features, wherein each hypothesis is a possible cause of the collection of events and has associated therewith a confidence value, together with a set of indicators whose presence in the set of observable features is unknown;
   rank ordering the set of hypotheses initially according to the confidence values;
   for each hypothesis in the set of hypotheses, adjusting the confidence value based on an extent to which each indicator in the set of indicators for the hypothesis occurs in the collection of events;
   adjusting the rank ordering of the set of hypotheses based on the adjusted confidence values; and
   using the adjusted rank-ordered set of hypotheses to facilitate providing of a response to the security offense.

2. The method as described in claim 1 wherein the set of indicators in each hypothesis are tested for occurrence in the collection of events sequentially, beginning with a highest ranked indicator.

3. The method as described in claim 2 wherein the testing generates a cumulative confidence value for the hypothesis, and the rank ordering of the set of hypotheses is adjusted based on the cumulative confidence values of respective hypotheses.

4. The method as described in claim 1 wherein at least one hypothesis in the set of hypotheses has associated therewith a maliciousness value.

5. The method as described in claim 1 further including outputting to a security analyst the adjusted rank-ordered set of hypotheses together with the set of observables and the adjusted confidence values.

6. The method as described in claim 2 further including removing any hypothesis from the rank ordering whose tested indicators do not occur in the collection of events.

7. The method as described in claim 1 wherein the confidence values are adjusted according to a confidence schema.

8. An apparatus, comprising:
   a processor;
   computer memory holding computer program instructions executed by the processor to corroborate and act upon a threat assessment, the threat assessment comprising a security offense defined by a set of observable features in a collection of events associated to the security offense, the computer program instructions including program code configured to:

provide a set of hypotheses to account for the set of observable features, wherein each hypothesis is a possible cause of the collection of events and has associated therewith a confidence value, together with a set of indicators whose presence in the set of observable features is unknown;

rank order the set of hypotheses initially according to the confidence values;

for each hypothesis in the set of hypotheses, adjust the confidence value based on an extent to which each indicator in the set of indicators for the hypothesis occurs in the collection of events;

adjust the rank ordering of the set of hypotheses based on the adjusted confidence values; and use the adjusted rank-ordered set of hypotheses to facilitate providing a response to the security offense.

9. The apparatus as described in claim 8 wherein the set of indicators in each hypothesis are tested for occurrence in the collection of events sequentially, beginning with a highest ranked indicator.

10. The apparatus as described in claim 9 wherein the testing generates a cumulative confidence value for the hypothesis, and the rank ordering of the set of hypotheses is adjusted based on the cumulative confidence values of respective hypotheses.

11. The apparatus as described in claim 8 wherein at least one hypothesis in the set of hypotheses has associated therewith a maliciousness value.

12. The apparatus as described in claim 8 wherein the program code is further configured to output to a security analyst the adjusted rank-ordered set of hypotheses together with the set of observables and the adjusted confidence values.

13. The apparatus as described in claim 9 wherein the program code is further configured to remove any hypothesis from the rank ordering whose tested indicators do not occur in the collection of events.

14. The apparatus as described in claim 8 wherein the confidence values are adjusted according to a confidence schema.

15. A computer program product in a non-transitory computer readable medium for use in a data processing system to corroborate and act upon a threat assessment, the threat assessment comprising a security offense defined by a set of observable features in a collection of events associated to the security offense, the computer program product holding computer program instructions that, when executed by the data processing system, are configured to:

provide a set of hypotheses to account for the set of observable features, wherein each hypothesis is a possible cause of the collection of events and has associated therewith a confidence value, together with a set of indicators whose presence in the set of observable features is unknown;

rank order the set of hypotheses initially according to the confidence values;

for each hypothesis in the set of hypotheses, adjust the confidence value based on an extent to which each indicator in the set of indicators for the hypothesis occurs in the collection of events;

adjust the rank ordering of the set of hypotheses based on the adjusted confidence values; and use the adjusted rank-ordered set of hypotheses to facilitate providing a response to the security offense.

16. The computer program product as described in claim 15 wherein the set of indicators in each hypothesis are tested for occurrence in the collection of events sequentially, beginning with a highest ranked indicator.

17. The computer program product as described in claim 16 wherein the testing generates a cumulative confidence value for the hypothesis, and the rank ordering of the set of hypotheses is adjusted based on the cumulative confidence values of respective hypotheses.

18. The computer program product as described in claim 15 wherein at least one hypothesis in the set of hypotheses has associated therewith a maliciousness value.

19. The computer program product as described in claim 15 wherein the program code is further configured to output to a security analyst the adjusted rank-ordered set of hypotheses together with the set of observables and the adjusted confidence values.

20. The computer program product as described in claim 16 wherein the program code is further configured to remove any hypothesis from the rank ordering whose tested indicators do not occur in the collection of events.

21. The computer program product as described in claim 15 wherein the confidence values are adjusted according to a confidence schema.

* * * * *